May 18, 1943. E. F. ZAP 2,319,383
LINKAGE MOUNTING FOR AERODYNAMIC MEMBERS
Filed Jan. 19, 1942
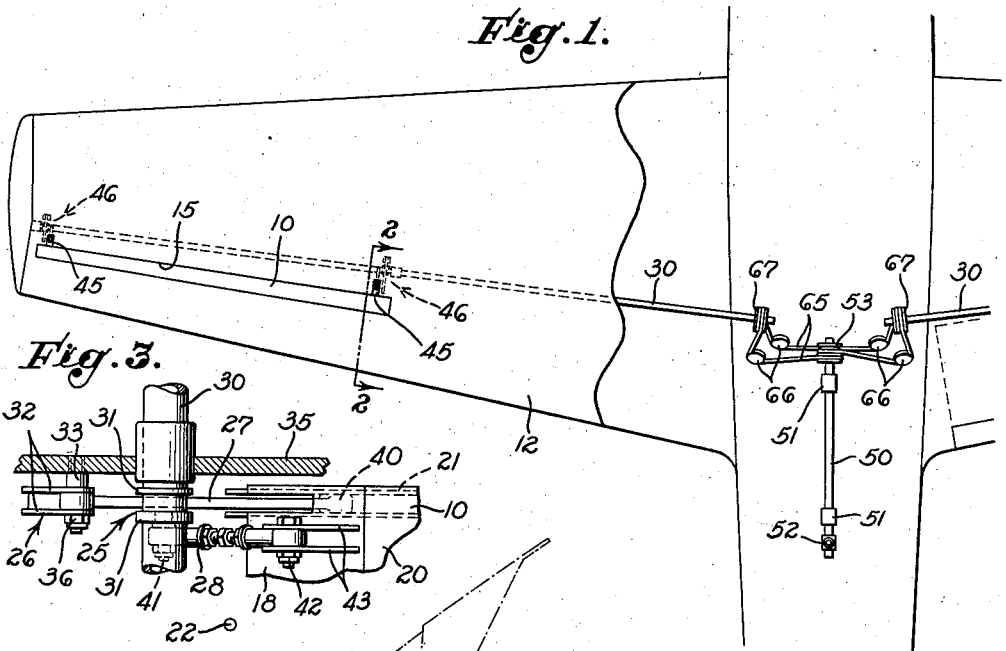
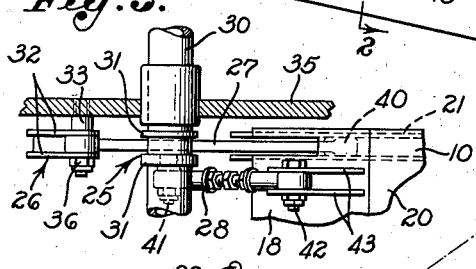
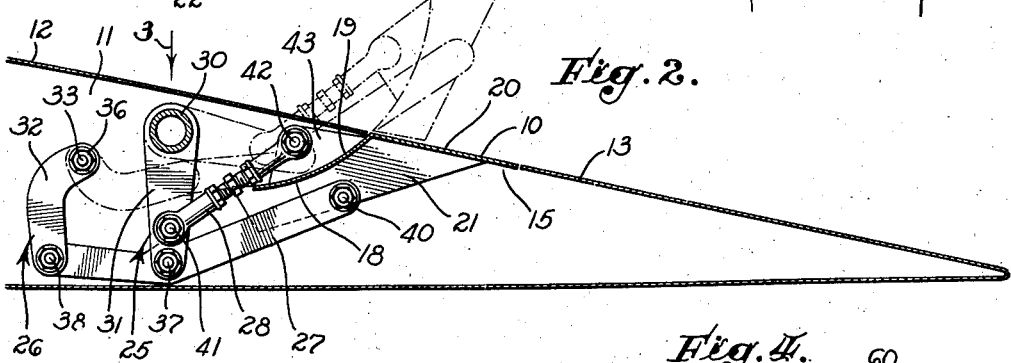
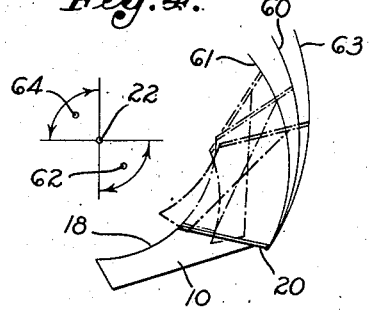
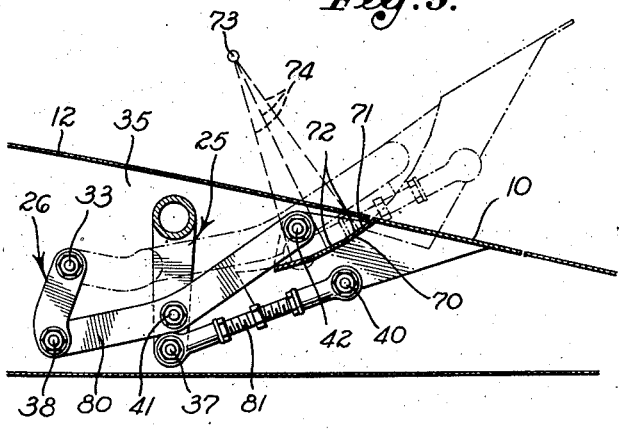
INVENTOR
EDWARD F. ZAP
BY
HARRIS, KIECH, FOSTER & HARRIS
FOR THE FIRM
ATTORNEYS.

Patented May 18, 1943

2,319,383

UNITED STATES PATENT OFFICE 2,319,383

LINKAGE MOUNTING FOR AERODYNAMIC MEMBERS

Edward F. Zap, Los Angeles, Calif.

Application January 19, 1942, Serial No. 427,236

11 Claims. (Cl. 244—90)

My invention relates to means for mounting and operating aerodynamic members, such as ailerons, flaps, and the like for controlling aircraft in flight, and refers particularly to such means for moving an aerodynamic member along a curved path. While the invention is applicable to the mounting and control of aerodynamic members at various locations on an airplane, it is especially applicable to means for mounting and controlling ailerons or flaps that retract more or less into the confines of an airplane wing. For the purpose of the present disclosure I elect to describe the inventions as controlling such a retractable aileron.

In my copending application Serial No. 430,721, filed February 13, 1942, entitled "Aerodynamic member," I disclose an airplane wing with a hollow portion near its trailing edge having an opening to the upper surface of the wing. An aileron is mounted to move through said wing opening along a curved path between a retracted position more or less within the wing and an extreme upper position in the air stream outside the wing. In my copending application I disclose the aileron as mounted by track means or curved guide means in combination with rollers, which combination guides the movement of the aileron along a path of desired curvature. One of the important objects of the present invention is to achieve various advantages by the substitution of a linkage mounting for the track-and-roller mounting of my copending application, the linkage mounting being designed to guide the aileron in a substantially equivalent manner along a curved path.

As discussed in my copending application, the relation of the forward or effective surface of the aileron to the curvature of the aileron path is a factor, in special cases the only factor, determining whether or not the aileron tends to move along its curved path in response to the pressure from the air stream, and if so, the direction of such tendency. If the effective surface of the aileron is substantially concentric to the center or centers of the track curvature, substantially no such tendency is derived from the pressure of the air stream against the extended aileron. Likewise, substantially no such tendency is created if the aileron has one or more plane surfaces that are substantially tangential to the surface of path curvature, i. e., are perpendicularly bisected by radii from the center of the path curvature. If, however, the center or centers of curvature of the effective aileron surface are forward of the center or centers of curvature of the aileron path, the aileron will tend to move outward in response to the air stream and, on the other hand, if the center or centers of curvature of the aileron surface are rearward of the center or centers of curvature of the aileron path, the aileron will tend to move inward from an extended position in response to pressure from the air stream.

It is apparent, then, that an inherent force tending to move the aileron in one direction or the other may be provided by designing the aileron and the aileron mounting with proper attention to the relationship between the configuration of the aileron and the configuration of the aileron path. One of the important objects of the present invention is to provide a linkage that may be readily modified to determine the magnitude and direction and even the variability of such inherent force throughout the operating range of the aileron.

Usually the end sought is an aileron that moves readily and yet tends to retract to a degree definitely perceptible to the pilot. If the tendency to retract varies with the extension of the aileron, the varying resistance to movement of the control stick gives the pilot a "feel" of the control mechanism that is necessary for skillful flying. In various practices of my invention the relation between the configuration of the aileron and the curvature of the aileron path may have various degrees of importance in determining the tendency of the aileron to exert reverse force on the control mechanism. In some practices, as pointed out in the above copending application, the dominant if not sole factor is the relationship between the configuration of the aileron and the curvature of the path; and in other practices the configuration of the face or forward surface of the aileron with relation to the configuration of the aileron path is neutral with respect to providing any such tendency, and the required tendency is derived from one or more air-deflecting surfaces on the aileron other than the forward aileron surface. It is an object of the present invention to provide a linkage mounting that may be adapted to any of these various practices of the invention.

The above and other objects of my invention will be apparent from the following detailed description, taken with the accompanying drawing.

In the drawing, which is to be considered as illustrative only:

Fig. 1 is a diagrammatic plan view of an aileron and associated control mechanism, the aileron being mounted by the linkage of the present invention;

Fig. 2 is a transverse section on an enlarged scale, taken as indicated by the line 2—2 of Fig. 1;

Fig. 3 is a plan view of a portion of the control linkage, taken as indicated by the arrow 3 in Fig. 2;

Fig. 4 is a diagrammatic view illustrating different curved paths of movement that may be produced by changes in the design of the linkage mounting; and Fig. 5 is a view similar to Fig. 2 showing an alternative form of the control linkage.

The aileron generally designated 10 in Figs. 1 to 3 is mounted in a hollow portion 11 of a wing 12, the hollow portion being near the trailing edge of the wing. The upper skin 13 of the wing is formed with an opening 15 from the hollow portion through which the aileron is operatively extended and retracted.

With reference to the aileron 10, the aileron proper may be in the form of a plate 18, the plate providing the required forward or effective aileron surface generally designated 19. In some practices of the invention, including the practice exemplified by the present drawing, the aileron includes an end plate 20 that may aptly be termed a deflection plate since one of its important functions is to deflect the air stream and thereby create a tendency for the aileron to retract from the air stream. The plate 18 and the deflection plate 20 may be reinforced and interconnected in a unitary aileron structure by a series of spaced reinforcing plates 21 lying in substantially vertical planes.

The forward surface 19 of the aileron provided by the plate 18 may be of various configurations, but in this instance it will be assumed that the configuration of the plate relative to the path of aileron movement is such that the pressure of the air stream against the plate creates substantially no tendency for the aileron to retract, it being contemplated that the tendency to retract will arise solely from the effect of the deflection plate 20. Fig. 2 shows the location of a point or axis 22 which is selected as the approximate center of curvature for the path along which the aileron 10 is to move. Since the forward surface of the aileron is to be neutral with respect to any tendency for the aileron to move along the proposed curved path, the plate 18 is curved substantially concentrically of the point or axis 22.

My novel linkage for mounting the aileron 10 for movement in a path substantially concentric to the center or axis 22 or other paths of curved configuration may comprise two rocker members in the form of rocker arms generally designated 25 and 26 in combination with a first control link 27 and a second control link 28. Such a linkage may be employed not only for the purpose of guiding the aileron but also for the purpose of actuating or controlling the aileron. In the arrangement shown in the drawing, one of the rocker arms, in this instance the rocker arm 25, is mounted on a suitable shaft 30 by means of which the aileron is actuated. The rocker arm 25 may comprise a pair of spaced parallel bars 31 welded or otherwise united with the shaft 30. The other rocker arm 26 may likewise comprise a pair of spaced parallel bars 32 mounted on a pivot means in the form of a stationary stud 33. The stud 33, which may be mounted on a rib 35 inside the wing, is threaded to receive a nut 36 for retaining the rocker arm 26.

The first control link 27 may be regarded as carried by the two rocker arms 25 and 26 to be translated thereby in a curved path. In my preferred construction the link extends between the two bars 31 of the rocker arm 25 and between the two bars 32 of the rocker arm 26, the link being connected to the rocker arm 25 by suitable pivot means 37 and being connected to the rocker arm 26 by suitable pivot means 38. The first control link 27 extends rearward from the two arms 25 and 26 and is connected to the aileron 10 by a suitable pivot means 40 that is mounted on one of the reinforcing plates 21.

The second control link 28, which is preferably of adjustable length, is connected at one end to a suitable pivot means 41 mounted on one of the parallel bars 31 of the rocker arm 25 and is connected at its other ends to a pivot means 42 carried by the aileron 10. In the particular construction shown in the drawing the pivot means 42 is mounted on a bracket in the form of small plates 43 that extend forward and upward from the effective surface of the aileron. To provide suitable clearance for movement of the second control link 28 and the bracket 43 through the upper skin 13 of the wing, a suitable slot 45 extending from the wing opening 15 may be cut in the upper skin as indicated in Fig. 1. The various pivots for rotating parts in the described linkage may be provided with suitable anti-friction bearings if desired.

The aileron 10 requires, of course, at least two of the described linkages for proper support. Fig. 1 shows two such linkages generally designated 46 near the opposite ends of the aileron.

The operating shaft 30 in each of the wings is mounted on suitable bearings and may be controlled from the cockpit of the airplane by any of various well known control mechanisms. The particular control mechanism shown in Fig. 1 includes the usual torque tube 50 mounted in bearings 51 in the cockpit, the torque tube carrying the usual control stick 52 and being provided with a cable drum 53. Cables 65 wound on the drum 53 pass around various pulleys 66 and around drums 67 on the inner ends of the shafts 30. When the control stick 52 is swung to the left as viewed in Fig. 1, the left aileron 10 is extended upward into the air stream to cause the left wing 12 to drop and simultaneously to cause increased drag in the same wing.

Fig. 2 indicates the relative dimensions and relative positions of the two rocker arms 25 and 26 and of the two control links 27 and 28 required to cause the aileron to move on a curved path that is substantially concentric to the center or axis 22. When the aileron moves from the retracted position shown in full lines in Fig. 2 to the position shown in dotted lines, the pivot means 40 on the aileron is guided in a curved path determined by the relative lengths and positions of the two rocker arms, and the second control link 28 acting through the second pivot means 38 is effective during the aileron movement to maintain the curved plate 18 of the aileron in a position substantially concentric to the center or axis 22. In some embodiments of my linkage, absolute concentricity with respect to the curvature of the aileron path and the curvature of the effective surface of the aileron may not be attained, but absolute concentricity may be approximated closely enough to avoid engendering any significant tendency for the aileron to retract in response to pressure from the air stream against the forward curved surface of the aileron.

As emphasized in my above-mentioned copending application, substantial eccentricity of the path of aileron movement relative to the curvature of the forward effective aileron surface may be sought in some practices of the invention for the purpose of engendering an effective tendency for the aileron to move along its operating path in reaction to the air stream. Fig. 4 shows diagrammatically an aileron 10 having an effective surface curved about the previously mentioned center 22. The above described linkage causes the aileron to move in a path represented by the curved line 60 that is concentric to the center or axis 22. If it is required that the impingement of the air stream against the curved effective surface of the aileron create a tendency for the aileron to retract, the above described linkage will be modified to cause the aileron to move about a path concentric to a center or centers rearward of the center 22. For example, the linkage may be designed to cause the aileron to follow a curved path represented by the line 61 that is concentric to a center or axis 62, the center 62 being rearward of the center of curvature 22 of the forward surface of the aileron. On the other hand, the linkage may be designed to create an inherent tendency for the aileron to move outward in response to the air stream. Such a tendency will be provided, for example, if the linkage moves the aileron 10 along a path represented by the line 63 that is approximately concentric to a center or axis 64, the center lying forward of the center of surface curvature 22.

Only the ordinary skill to be expected in this art is required to modify the linkage of Fig. 2 in various possible ways to vary the curvature of the aileron path thereby to achieve any desired "behavior" on the part of the aileron. Starting with the linkage of Fig. 2 for moving the aileron along the curved path 60, the designer may change the path of the aileron to the general eccentricity of the path 63 by any of the following expedients: shifting the pivot stud 33 downward and/or to the left as viewed in Fig. 2; shifting the pivot means 38 to the right; shifting the pivot means 41 downward towards the pivot means 37; shifting the pivot means 42 upward and/or to the left; or shifting the pivot means 40 downward. On the other hand, the linkage of Fig. 2 may be modified to produce the eccentricity represented by the path 61 by any of the following expedients: shifting the pivot stud 33 upward and/or to the right; shifting the pivot means 38 to the left; shifting the pivot means 41 upward away from the pivot means 37; shifting the pivot means 42 downward and/or to the right; or shifting the pivot means 40 upward.

While the possible shifts of the pivot points with corresponding changes in lengths and positions of the various elements of the linkage all fall in the above two categories, each suggested shift produces an effect on the aileron path differing from the effect produced by any of the other shifts. It is apparent that the designer is offered a sufficient variety of controllable factors with respect to the aileron path to enable him by an empirical approach to approximate any desired inherent tendency of air pressure on the forward surface of the aileron to move the aileron in either direction at various degrees of extension of the aileron.

The purpose of Fig. 5 is to indicate that the arrangement shown in Fig. 2 may be modified in two different respects; first, in the configuration of the effective surface of the aileron, and, second, in the arrangement of the two control links in the linkage mounting. Parts substantially identical with the parts previously described are designated by corresponding numerals in Fig. 5.

The aileron 10 in Fig. 5 has what may be termed an angular plate 70 to provide an angular effective surface 71 instead of the previously mentioned curved plate 18. The angular plate 70 is divided by transverse bends into a series of flat sections 72 that may be substantially tangential to a curved line corresponding to the previously mentioned curved surface 19. For example, the sections 72 may be so disposed that dotted lines 74 perpendicularly bisecting each of the flat sections all pass through the center or axis 73. If the curvature of the aileron path is substantially concentric to the center or axis 73, the pressure of the air stream on each of the aileron sections 72 will be neutral with respect to any tendency for the aileron to move either inward or outward.

The linkage mounting shown in Fig. 5 differs from the linkage mounting of Fig. 2 in a certain reversal of the two control links. Fig. 5 shows what may be termed a first control link 80 that is connected to the rocker arm 25 by the pivot means 41 instead of by the pivot means 37 and is connected to the aileron 10 by the pivot means 42 instead of the pivot means 40. What may be termed the second control link 81 corresponding to the previous control link 28 is connected to the rocker arm 25 by the pivot means 37 instead of the pivot means 41 and is connected to the aileron 10 by the pivot means 40 instead of the pivot means 42. Notwithstanding the described reversal, the link shown in Fig. 5 will cause the aileron 10 to follow a path substantially concentric to the center or axis 73 and may be modified to cause the aileron to follow various eccentric paths exemplified in Fig. 4.

It will be readily appreciated by those skilled in the art that various changes and substitutions may be made in the described linkage mounting without departing from my basic conception, and I therefore reserve the right to all such departures from my disclosure that lie within the scope of my appended claims.

I claim as my invention:

1. Means for mounting an aerodynamic member for movement on a curved path, said means including: two spaced rocker means; a first control link pivotally connected to each of said rocker means and pivotally connected to said aerodynamic member; and a second control link spaced from said first control link, said second control link being pivotally connected to only one of said rocker means and being pivotally connected to said aerodynamic member, said two control links supporting said aerodynamic member.

2. Means for mounting an aerodynamic member for movement on a curved path, said means including: two spaced rocker arms mounted to point simultaneously in substantially the same general direction; a first control link having a pivotal connection with said aerodynamic member, said control link being connected with both said rocker arms to be translated thereby in a curved path, whereby said pivotal connection is moved in a curved path; and a second control link connected to only one of said rocker arms and having a pivotal connection with said aerodynamic member spaced from said first mentioned pivotal connection, said two control links supporting said aerodynamic member.

3. In an aircraft, the combination of: an airfoil having a hollow portion with an opening to the surface of the airfoil; an aerodynamic member movable through said opening between an inner position and an outer position extending into the air stream outside the airfoil; two spaced rocker means inside said airfoil; a first control link interconnecting said two rocker means to be translated thereby in a curved path, said first control link having a pivotal connection with said aerodynamic member; and a second control link connected with only one of said rocker means and having a pivotal connection with said aerodynamic member spaced from said first mentioned pivotal connection, said two rocker means and two control links being disposed and dimensioned to guide said aerodynamic member on a curved path between said two positions approximately concentric to at least one point in said air stream.

4. In an aircraft, the combination of: an airfoil having a hollow portion with an opening to the surface of the airfoil; an aerodynamic member movable through said opening between an inner position and an outer position extending into the air stream outside the airfoil, the surface of the aerodynamic member that meets the air stream being curved substantially concentrically to at least one point in said air stream; a first control link interconnecting said two rocker means to be translated thereby in a curved path, said control link having a pivotal connection with said aerodynamic member; and a second control link connected with only one of said rocker means and having a pivotal connection with said aerodynamic member spaced from said first mentioned pivotal connection, said two rocker means and two control links being disposed and dimensioned to guide said aerodynamic member on a curved path between said two positions substantially concentric to at least one point in said air stream.

5. A combination as set forth in claim 4 in which said center or centers of curvature of the aerodynamic member and said center or centers of curvature of the path of movement substantially coincide, whereby the air stream impinging on said aerodynamic member exerts no substantial component of force along said path.

6. A combination as set forth in claim 4 in which said center or centers of curvature of the aerodynamic member lie forward of the center or centers of curvature of the aileron path, whereby the air stream on said aerodynamic member exerts a component of force tending to extend the aileron into the air stream.

7. A combination as set forth in claim 4 in which said center or centers of curvature of the aerodynamic member are rearward of the said center or centers of curvature of said aileron path, whereby the air stream impinging on said aerodynamic member creates a component of force tending to retract said aerodynamic member out of the air stream.

8. In an aircraft, the combination of: an airfoil having a hollow portion with an opening to the surface of the airfoil; an aerodynamic member movable through said opening between an inner position and an outer position extending into the air stream outside the airfoil, the surface of the aerodynamic member that meets the air stream being divided into a plurality of sections substantially tangential to a line of curvature having a center or centers in the air stream forward of the aerodynamic member; a first control link interconnecting said two rocker means to be translated thereby in a curved path, said control link having a pivotal connection with said aerodynamic member; and a second control link connected with only one of said rocker means and having a pivotal connection with said aerodynamic member spaced from said first mentioned pivotal connection, said two rocker means and two control links being disposed and dimensioned to guide said aerodynamic member on a curved path between said two positions substantially concentric to at least one point in said air stream forward of the aerodynamic member.

9. In an aircraft a combination as set forth in claim 4 in which perpendicular bisectors of said sections meet substantially at a point in the air stream forward of the aerodynamic member.

10. In an aircraft a combination as set forth in claim 8 in which perpendicular bisectors of said sections meet substantially at a point in the air stream forward of the aerodynamic member and in which the curvature of said path is substantially concentric to said point.

11. In an aircraft a combination as set forth in claim 8 in which said sections have perpendicular bisectors meeting substantially at a point in the air stream forward of the aerodynamic member and in which the curvature of said path is eccentric with respect to said point, whereby pressure of the air stream against said sections creates a force tending to move the aerodynamic member along said path.

EDWARD F. ZAP.